United States Patent [19]

Pepper et al.

[11] Patent Number: 5,271,132
[45] Date of Patent: Dec. 21, 1993

[54] AUTOMATIC STONE SETTING MACHINE

[75] Inventors: James T. Pepper, Coventry; James J. Wardle, Riverside; David P. Braman, North Kingstown, all of R.I.

[73] Assignee: Crafford Precision Products Co., Riverside, R.I.

[21] Appl. No.: 982,519

[22] Filed: Nov. 27, 1992

[51] Int. Cl.⁵ .............................................. B23P 5/00
[52] U.S. Cl. ...................................... 29/10; 29/160.6
[58] Field of Search .............................. 29/10, 160.6; 63/26–28

[56]  References Cited
U.S. PATENT DOCUMENTS

| | | | |
|---|---|---|---|
| 562,292 | 6/1896 | Field | 29/10 |
| 1,135,576 | 4/1915 | Grabau | 29/10 |
| 2,070,737 | 2/1937 | Kahan | 29/10 |
| 2,667,686 | 2/1954 | Richardson | 29/10 |

Primary Examiner—P. W. Echols
Attorney, Agent, or Firm—Salter, Michaelson & Benson

[57] ABSTRACT

An automatic stone setting machine includes a vibratory parts feeder which orients the stones in the correct position for pick-up and a pick-up quill which is capable of sensing the position of the stone on the end of the quill. The vibratory parts feeder includes an escapement having a v-shaped track, an aperture at the end of the track and a cover plate mounted over the track. The track and cover plate cooperate to create a passageway which only allows correctly oriented stones to pass through to the pick-up point. The pick-up end of the pick-up quill has an inwardly tapered side portion, a flat seat at the inner end of the tapered side portion and four circumferentially spaced vacuum ports located in the tapered side portion. The flat seat receives the top of the stone and the tapered side portion receives the angled side faces of the stone which block the vacuum ports. A vacuum sensor is provided to sense the level of vacuum applied through the vacuum ports. When all the vacuum ports are blocked by the angled side faces of the stone, the sensor produces a signal indicating the stone is correctly positioned on the end of the quill for mounting in the setting.

11 Claims, 3 Drawing Sheets

AUTOMATIC STONE SETTING MACHINE

BACKGROUND OF THE INVENTION

The instant invention relates to an automatic stone setting machine and more particularly to a vibratory feed escapement and a pick-up quill therefor.

Costume jewelry ornaments, such as rhinestones, are usually held in settings with prongs that are bent over the top of the stones in a manner similar to the settings of real diamonds. For many years, the setting procedures were performed manually, requiring significant manpower and labor to mass produce large quantities of costume jewelry articles. Workers manually oriented the rhinestones in the settings and then used a manual setting tool to bend the prongs over the tops of the stones. In response to increasing labor costs, automatic stone setting machines have heretofore been developed to eliminate the slow, repetitive labor. As will hereinafter be more fully explained, automatic stone setting machines of the general type known in the art are operative for automatically setting a plurality of individual stones into a continuous chain of interconnected settings. It is pointed out that for purposes of mass production, the rhinestones are commonly set into an interconnected chain of settings and thereafter, the chain is divided into individual sections which are used to make earrings, tennis bracelets, necklaces and other types of costume jewelry articles.

The heretofore known automatic stone setting machines generally comprise a rigid base, a toothed wheel rotatable upon the base for holding and advancing the chain of individual settings, a feed mechanism for holding and orienting the rhinestones in the proper position for pick-up, and a pick-up mechanism for picking up an individual stone and setting it into one of the settings on the chain. The feed mechanism comprises a vibratory parts feeder having a vibrating bowl, and a feed plate or escapement on the bowl which channels the rhinestones into position for pick-up. The pick-up mechanism comprises a pick-up quill which is spring mounted within a setting tool. The pick-up quill includes a central bore through which a vacuum is applied. The pick-up quill is mounted on a reciprocating arm which moves the pick-up quill into position to pick up a stone in the escapement and then back into position over the top of setting. For pick-up of a stone, the quill is received over the top of the stone wherein the vacuum is applied through the central bore in the pick-up quill to the flat top of the stone. The flat top of the stone blocks the vacuum flow of air through the quill and the stone is thereby retained at the end of the quill. The vacuum remains activated and the arm is moved back into position over the setting wherein the arm is then actuated downwardly onto the setting. The pick-up quill is spring loaded inside a setting tool so that when the arm is moved downwardly onto the setting, the stone is placed into the setting and the setting tool continues to move downwardly to bend the prongs over the top of the stone thereby retaining the stone within the setting. The vacuum source is then deactivated, and the chain advanced so that the next setting is moved into position. It can thus be seen that the automatic stone setting machine is operative for picking up an individual rhinestone from the escapement, placing the stone into a setting, bending the prongs of the setting over the stone, and advancing the chain to move the next setting into position.

Although the heretofore known automatic stone setting machines have generally been found to be effective, there are several design flaws which often cause the machines to pick up and set stones improperly, thereby causing defects or flaws in the continuous chain of settings. Defects in the chain of settings requires that the chain be sectioned more frequently than is necessary, thereby causing sections of chain to be wasted. One particular reason for the defective settings is the improper orientation of the stones at the pick up position. The heretofore known vibratory feed escapements have been found to regularly channel upside-down or improperly oriented rhinestones into the pick-up position. Further, the centrally located vacuum port of the quill enables the quill to pick up incorrectly oriented stones because the central hole in the quill is easily blocked by the pointed bottom of the stone or the angled side edges of the stone. Occasionally, it has been observed that a stone is oriented in a position that will not block the vacuum port and therefore the quill is prevented from picking up the stone. Still further, it has been found that even when the queued stone is properly oriented at the pick-up point, the movement of the queued stone while being picked-up can often flip the next adjacent stone into an improper position. There is thus no currently available means for determining if there is a stone present on the quill, and further, when there is a stone on the quill, if the stone is in the correct orientation.

SUMMARY OF THE INVENTION

The instant invention provides an automatic stone setting machine which significantly reduces the number of flawed or empty settings in a continuous chain of set stones.

The stone setting machine is operative for setting a plurality of ornamental stones, such as rhinestones, into a continuous chain of interconnected stone settings. The automatic stone setting machine comprises a vibratory parts feeder, a toothed wheel assembly, a reciprocating arm assembly and a pick-up assembly mounted at one end of the reciprocating arm assembly.

The vibratory parts feeder comprises a vibratory motor, a bowl having an upwardly spiralling channel formed therein, and an escapement mounted at the upper end of the upwardly spiralling channel. The vibratory parts feeder is operative for urging a plurality of stones upwardly along the spiraling channel to the escapement. The escapement comprises a V-shaped track, a vacuum aperture at one end of the track and a cover plate mounted over the track adjacent to the vacuum aperture. The track communicates with the spiralling channel of the bowl wherein the stones are urged along the track, under the cover plate and towards the aperture which receives the pointed bottom of the forward most stone. The inside wall of the V-shaped track is lower than the outer wall so that upside-down stones tend to fall out of the track and back into the bowl. The cover plate and V-shaped track cooperate to form a passageway which only allows correctly oriented stones to pass through towards the aperture. A vacuum generator is provided for selectively applying a vacuum through the aperture to maintain the stone in position in the aperture while it is waiting to be picked up by the pick-up assembly.

The toothed wheel comprises a circular toothed plate which is rotatable upon the base for holding and advancing the chain of settings through the machine. Each pair of teeth on the wheel is operative for holding a single stone setting wherein the empty settings are advanced to a setting position at the front end of the machine.

The pick-up assembly comprises a housing, a setting tool fixedly mounted in the housing and a pick-up quill which is spring mounted inside the setting tool. The pick-up quill comprises a cylindrical body portion and a reduced diameter pick-up end having an inwardly tapered side portion, a flat seat at the inner end of the tapered side portion, and two pairs of oppositely disposed vacuum ports located in the tapered side portion. It is pointed out that the pick-up end of the quill is shaped so that the flat top of the stone is receivable adjacent the flat seat and the angled side faces are snugly receivable adjacent the inwardly tapered side portion. The pick-up assembly is provided with a vacuum generator which is operable for selectively applying a vacuum to the vacuum ports. The vacuum generator includes a vacuum sensor and switch which is adjusted so that it will only generate a signal when all four of the vacuum ports are substantially blocked by the side faces of the stone. When a stone is not correctly picked up, the system's electronics sense the non-activation of the switch and prevent the setting tool from being actuated and the chain from being advanced. It can therefore be appreciated that the structure of the pick-up quill enables the vacuum sensor to sense the position of the stone on the end of the quill.

The pick-up assembly is mounted at one end of the reciprocating arm assembly, and the arm assembly is operative for moving the pick-up assembly between a first position wherein the pick-up quill is positioned directly over the setting position, and a second position wherein the pick-up quill is received over the top of the queued stone in the escapement. The arm moves from the first position to the second position wherein the stone is picked up by the quill, and then the arm moves back to the first position wherein the arm is actuated downwardly so that the stone is received into the setting. The toothed wheel is then rotated to advance the next empty setting.

Accordingly, it is an object of the instant invention to provide an automatic stone setting machine which significantly reduces the number of flawed or empty settings in a continuous chain of set stones.

It is another object to provide an escapement for a vibratory parts feeder which effectively channels ornamental stones into the correct pick-up position and prevents incorrectly oriented stones from reaching the pick-up point.

It is another object to provide a pick-up quill for an automatic stone setting machine.

It is still another object to provide a pick-up quill which includes vacuum ports located at an inwardly tapered side portion of the pick-up end so that the vacuum is applied to the angled side faces of an ornamental stone.

It is yet another object to provide a vacuum generator for a pick-up quill which includes a vacuum sensor and a switch which only generates a signal when all of the vacuum ports are substantially blocked by the side faces of the ornamental stone.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE PREFERRED EMBODIMENT

Figure 1:
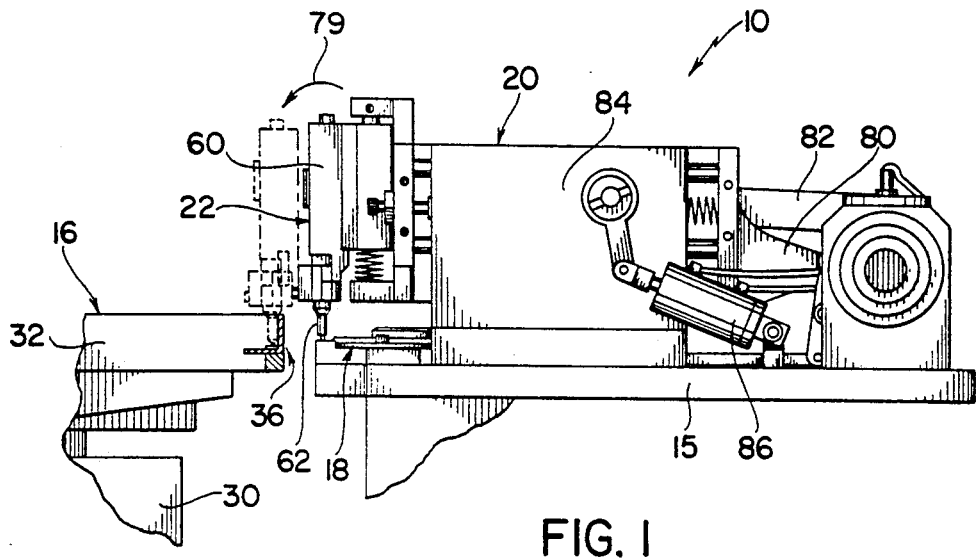
FIG. 1 is a side elevational view of the automatic stone setting machine of the instant invention.
Figure 2:
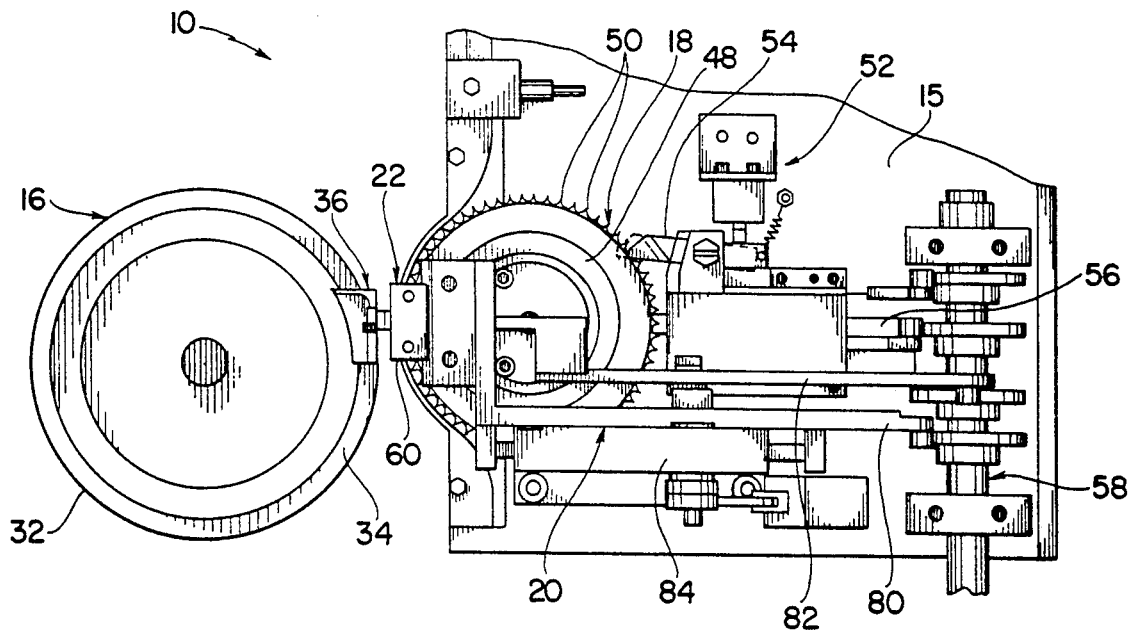
FIG. 2 is a top elevational view thereof.
Figure 8:
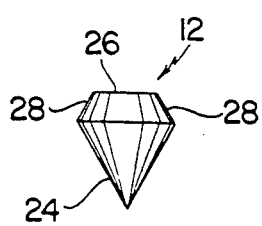
FIG. 8 is a side view of an ornamental rhinestone.

Referring now to the drawing figures, the automatic stone setting machine of the instant invention is illustrated and generally indicated at 10 in FIGS. 1 and 2. As will hereinafter be more fully disclosed, the automatic stone setting machine is operative for setting a plurality of ornamental stones generally indicated at 12 in FIG. 8, such as rhinestones, into a continuous chain of interconnected stone settings generally indicated at 14 in FIG. 9. The automatic stone setting machine 10 comprises a rigid base 15, a vibratory parts feeder generally indicated at 16, a toothed wheel assembly generally indicated at 18, a reciprocating arm assembly generally indicated at 20 and a pick-up assembly generally indicated at 22 mounted at one end of the reciprocating arm assembly 20.

Ornamental stones 12, such as rhinestones, are well known in the art and they include a pointed bottom 24, a flat top 26 and a plurality of angled side faces 28.

The vibratory parts feeder 16 comprises a vibratory motor 30, a bowl 32 having an upwardly spiralling channel 34 formed therein, and an escapement generally indicated at 36 mounted at the upper end of the upwardly spiralling channel 34. The motor 30 preferably comprises an FMC model EB-00-C vibratory motor and the bowl 32 preferably comprises an FMC model A-57917 bowl. The bowl 32 is operative for holding a plurality of stones 12, wherein the vibratory motion of the motor 30 urges the stones 12 upwardly along the spiraling channel 34 to the escapement 36.

Figure 3:
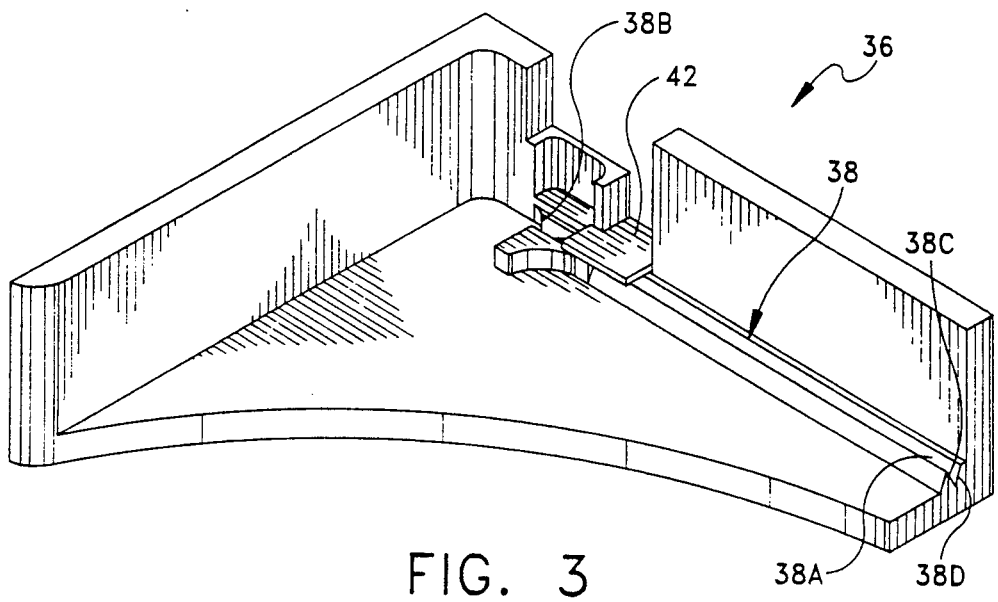
FIG. 3 is an enlarged perspective view of the vibratory feed escapement.
Figure 3A:
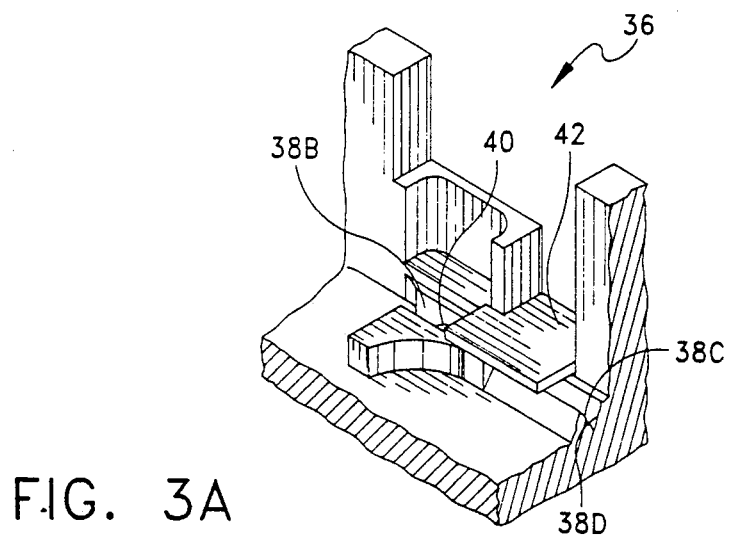
FIG. 3a is a further enlarged view of the escapement with the V-track, vacuum hole and cover plate shown in detail.
Figure 3B:
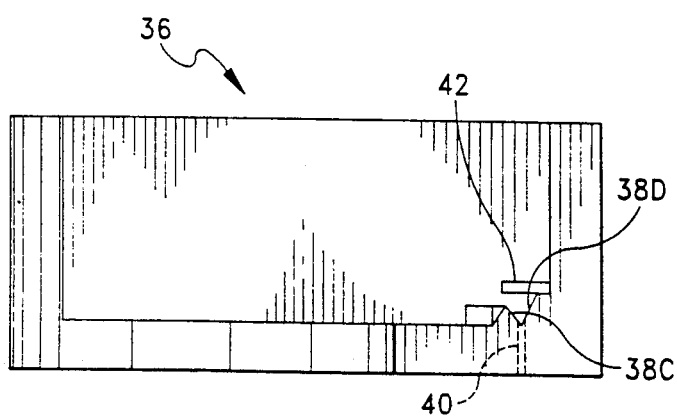
FIG. 3b is a right side end view of the escapement.
Figure 4:
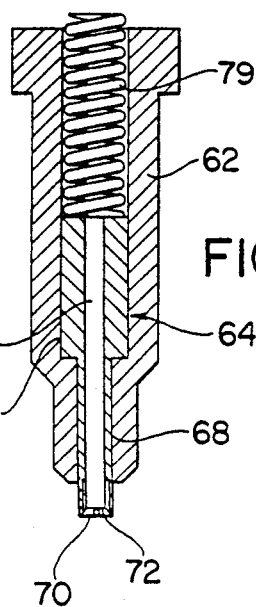
FIG. 4 is an enlarged cross sectional view of the pick-up quill and setting tool.
Figure 5:
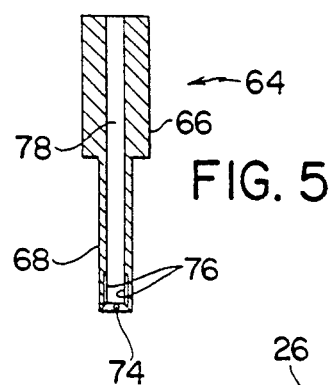
FIG. 5 is a cross sectional view of the pick-up quill.
Figure 7:
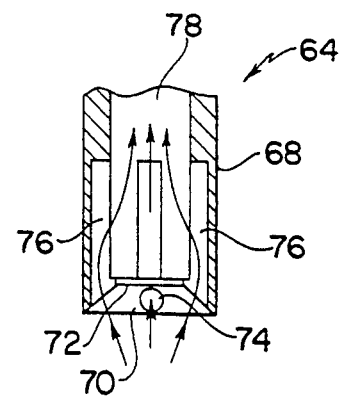
FIG. 7 is a further enlarged cross sectional view of the pick-up end of the quill with the vacuum flow through the vacuum ports shown in detail.
Figure 6:
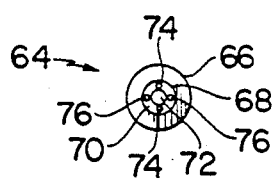
FIG. 6 is an end view or the pick-up quill.

Referring now to FIGS. 3, 3a and 3b the escapement 36 comprises a V-shaped track 38 having an upstream end 38a and a downstream end 38b, a vacuum aperture 40 at the downstream end 38b of the track 38 and a cover plate 42 mounted over the track 38 adjacent to the aperture 40. The upstream end 38a of the track 38 communicates with the spiralling channel 34 of the bowl 32, wherein a plurality of stones 12 are urged along the track 38, under the cover plate 42 and towards the aperture 40 which is operative for receiving the pointed bottom 24 of the forward most stone 12 in the track 38. The V-shaped track 38 further comprises an inside wall 38c and outside wall 38d. The inside wall 38c is lower than the outside wall 38d so that upside-down stones 12 tend to fall off the track 38 back into the bowl 32. The cover plate 42 and V-shaped track 38 cooperate to form a passageway having a cross section generally similar to the cross section of the stones 12. In this regard, stones 12 which are in the correct orientation, i.e. top face 26 up and pointed bottom 24 down, are allowed to pass through the passageway towards the aperture 40 and stones 12 which are incorrectly oriented (upside down or sideways) are knocked off the track 38 by the cover plate 42 and deposited back into the bowl 32 for later use. The cover plate 42 also serves to hold the adjacent stones 12 in the track 38 in the correct position when the forward most stone 12 is picked up by the pick-up assembly 22. The vibratory parts feeder 16 is further provided with a vacuum generator (not shown) for selectively applying a vacuum through the aperture 40. The vacuum generator preferably comprises an SMC model NZX1071-J15LZ-F vacuum generator including a control valve, a vacuum generator and a filter. The vacuum is applied through the aperture 40 against the pointed bottom 24 of the stone 12 and it effectively retains the stone 12 in the aperture 40 while it is waiting to be picked up by the pick-up assembly 22. The control valve is operated to shut the vacuum off when the pick-up assembly 22 is moved into position to pick-up the stone 12.

Figure 9:
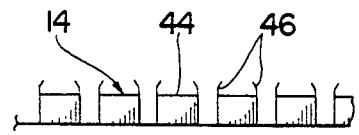
FIG. 9 is a side view of the continuous chain of interconnected stone settings.

Referring to FIG. 9, the stone settings 14 are also well known in the art, and they include a seat portion 44 for receiving the pointed bottom 24 of the stone 12 and a plurality of bendable prongs 46 which are bent over the top face 26 of the stone 12 to firmly retain the stone 12 in the setting 14. The stone settings 14 are interconnected in a continuous chain which is received in intermeshing engagement with the toothed wheel assembly 18 for sequential advancement through the machine 10.

The toothed wheel assembly 18 comprises a circular plate 48 rotatably mounted on the base 15, and it further includes a plurality of teeth 50 around the outer peripheral edge thereof. A ratchet mechanism generally indicated at 52 is provided for rotating the plate 48. Each pair of adjacent teeth 50 on the plate 48 is operative for holding a single stone setting 14 wherein empty settings are sequentially advanced to a stone setting position at the front of the machine 10. The reciprocating arm assembly 20 is operable for moving the pick-up assembly 22 to retrieve a single stone 12 from the escapement 36 and then to set it into the empty setting 14 at the setting position. The toothed wheel 18 is then rotated to advance the next sequential empty setting 14 to the setting position. Rotation of the toothed wheel 18 for advancement of the settings 14 is effected by the ratchet mechanism 52. The circular plate 48 includes a gear surface (not shown) on the underside thereof and the ratchet mechanism 52 comprises a spring biased ratchet lever 54 which is attached to a cam follower arm 56. The cam follower arm 56 rides on a cam shaft generally indicated at 58 which rotates to drive follower arm 56. Each rotation of the cam shaft 58 causes the ratchet lever 54 to advance the circular plate 48 one tooth segment, i.e. one setting 14.

Referring to FIGS. 1, 2 and 4 through 7, the pick-up assembly 22 comprises a housing 60, a setting tool 62 fixedly mounted in the housing 60 and a pick-up quill generally indicated at 64 spring mounted inside the setting tool 62. The pick-up quill 64 comprises a cylindrical body portion 66 and a reduced diameter pick-up end 68 having an inwardly tapered side portion 70, a flat seat 72 at the inner end of the tapered side portion 68 and two pairs of oppositely disposed vacuum ports 74 and 76 respectively located in the tapered side portion 68. The pairs of vacuum ports 74 and 76 are oppositely disposed so that they align with opposite side faces 28 of the stone 12 to deliver an equally distributed vacuum against the side faces 28 of the stone 12. It will be understood that a single pair of oppositely disposed vacuum ports 74 or 76, or three circumferentially spaced vacuum ports could also be utilized effectively, however two pairs of vacuum ports is the preferred embodiment. It is pointed out that the pick-up end 68 of the quill 64 is shaped so that the flat top 26 of the stone 12 is receivable adjacent the flat seat 72 and the angled side faces 28 are snugly receivable adjacent the inwardly tapered side portion 70. The pick-up quill 64 further includes a bore 78 which extends axially through the body portion 66 and into the pick-up end 68. The bore 78 communicates with the vacuum ports 74 and 76 so that a vacuum can be applied through the vacuum ports 74 and 76 from the end of the body portion 66. It is pointed out that when the pick-up end is received over the top of the stone 12 the vacuum is applied to the angled side faces 28 of the stone 12 in contrast to the prior art wherein the vacuum was applied to the flat top face 26 of the stone 12. The pick-up assembly 22 is provided with a vacuum generator (not shown) which communicates with the bore 78 and is operable for selectively applying a vacuum through the vacuum ports 74 and 76. The vacuum generator preferably comprises an SMC model NZX1071-K15LZ-PBCL vacuum generator including a control valve, a vacuum generator, a vacuum switch and a filter. The vacuum generator is operable for measuring the amount of vacuum being applied through the vacuum ports 74 and 76 and the vacuum switch is adjusted so that it will only generate a signal when both pairs of the vacuum ports 74 and 76 are substantially blocked by the angled side faces 28 of the stone 12. In this regard, both pairs of vacuum ports 74 and 76 will only be blocked when the stone 12 is correctly positioned in the aperture 40 in the escapement 36. If the quill 64 attempts to pick up an incorrectly oriented stone 12, the vacuum ports 74 and 76 will not be blocked thus preventing pick-up of the stone 12 and further preventing activation of the vacuum switch. The machine's electronics senses that the vacuum switch is not activated and thereafter prevents the pick-up assembly, more specifically the setting tool 62, from being actuated downwardly onto the empty setting 14. The machine's electronics also prevents the chain of settings 14 from being advanced when the vacuum switch is not activated. It can therefore be appreciated that the structure of the pick-up quill 64 enables the vacuum generator to sense the position of the stone 12 on the end of the quill 64.

The entire pick-up assembly 22 is mounted at one end of the reciprocating arm assembly 20 and the arm assembly 20 is operative for moving the pick-up assembly 22 between a first position, wherein the pick-up quill 64 is positioned directly over the setting position (solid lines in FIG. 1), and a second position wherein the pick-up quill 64 is positioned over the top of the queued stone 12 in the escapement 36 (Broken lines in FIG. 1). More specifically, the reciprocating arm assembly 20 is operable for moving the pick-up quill 64 from the first position outwardly and downwardly (see arrow 79 in FIG. 1) into the second position wherein the pick-up end 68 of the quill 64 is received over the top face 26 and side faces 28 of the queued stone 12 which is positioned in the aperture 40 in the escapement 36. When all four of the vacuum ports 74 and 76 become blocked the vacuum switch is activated. The system electronics senses the signal and shuts the vacuum to the vacuum aperture 40 off, thus releasing the stone 12 from the escapement 36 to be picked up by the quill 64. The reciprocating arm assembly 20 then moves the quill 64 back to the first position so that the stone 12 is positioned directly above the empty setting 14. It is pointed out that removal of the queued stone 12 causes the next adjacent stone 12 in the track 38 to be urged towards the aperture 40 for receipt of the pointed bottom 24 therein. The pick-up assembly 22 is then actuated downwardly by the arm assembly 20 so that the pointed bottom 24 of the stone 12 is received into the seat portion 44 of the setting 14. Since the quill 64 is spring mounted inside the setting tool 62, the setting tool 62 continues to move downwardly wherein the quill 64 retracts into the setting tool 62 against the bias of coil spring 79, and the setting tool 62 engages with the prongs 46 of the setting 14 to bend them over the top of the stone 12. The pick-up assembly 22 is then returned back to the first position and the toothed wheel 18 is rotated to advance the next empty setting 14. The process is repeated until the continuous chain of settings 14 is exhausted. It is pointed out that movement of the reciprocating arm assembly 20 is effected by a pair of cam follower arms 80 and 82 which are respectively driven by the cam shaft 58. Follower arm 80 is slidably associated with a rigid upright wall 84 mounted to the base 15 and it is operable for the outward and downward movement of the pick-up assembly. Cam follower arm 82 is operable for the downward actuation of the pick-up assembly onto the empty setting. A piston air cylinder 86 is mounted to the base and it is also rotatably associated with the cam follower arm 82. The cylinder 86 is operable for limiting the downward movement of the follower arm 82, and in this regard, when the vacuum switch is not activated, the system electronics activates the cylinder 86 to limit the downward movement of the setting tool 62 thereby preventing the machine 10 from setting an incorrectly oriented stone 12. The arrangement of the cam shaft 58 and follower arms 80 for movement of the reciprocating arm assembly 20 is relatively conventional in the art, and is not considered particularly important to the operation of the instant invention, and therefore no detailed explanation of the specific operation thereof is thought to be necessary.

It is seen therefore that the instant invention provides an effective automatic stone setting machine 10 which significantly reduces the number of flawed or empty settings in a continuous chain of interconnected settings 14. The escapement 36 of the vibratory parts feeder 16 effectively channels a plurality of stones 12 into the correct pick-up position and prevents incorrectly oriented stones 12 from reaching the pick-up point. Furthermore, the cover plate 42 of the escapement 36 prevents the adjacent stones 12 in the track 38 from becoming disrupted or flipped out of the correct orientation when the forward most stone 12 is picked-up by the pick-up quill 64. The pick-up quill 64 includes two pairs vacuum ports 74 and 76 which are circumferentially spaced around the tapered side portion of the pick-up end 68 so that the vacuum is applied to the angled side faces 28 of the stone 12 being picked up. The vacuum generator for the vacuum ports 74 and 76 includes a vacuum sensor and switch which only generates a signal when both pairs of the vacuum ports 74 and 76 are blocked by the side faces 28 of the stone 12. The machine electronics senses the vacuum signal so that if the sensor signal is not generated, the setting tool 62 is not actuated onto an empty setting 14 and the toothed wheel 18 is not advanced. These features enable the automatic stone setting machine 10 of the instant invention to effectively eliminate flawed settings by ensuring that the stones 12 are in the correct setting position before mounting thereof into the settings. For these reasons the automatic stone setting machine 10 of the instant invention is believed to represent significant advancements in the art which have substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. An automatic stone setting machine comprising:
    vibratory feed means operative for holding a plurality of ornamental stones therein, said stones including a pointed bottom, a flat top and a plurality of angled side surfaces;
    an escapement on said vibratory feed means comprising a V-shaped track, an aperture at one end of said track and a cover plate mounted in closely spaced relation over said track adjacent said aperture, said feed means urging said plurality of stones along said track, under said cover plate and toward said aperture wherein said aperture receives the pointed bottom end of an individual stone;
    means for holding a setting;
    a pick-up quill having a pick-up end comprising an inwardly tapered side portion, a flat seat at an inner end thereof and at least two circumferentially spaced vacuum ports located in said inwardly tapered side portion, said seat receiving the flat top of said stone, said side portion receiving the angled side faces of said stone;
    vacuum means for selectively applying a vacuum through said vacuum ports;
    reciprocating arm means for moving said quill between a first position, wherein said pick-up quill is positioned over said setting, and a second position wherein said pick-up quill is received on top of said stone at said aperture; and
    means for setting said stone into said setting.

2. The automatic stone setting machine of claim 1 further comprising means for sensing a level of vacuum applied through said vacuum ports, said sensor generating an electrical signal only when all of said vacuum ports are substantially blocked by the side faces of said stone.

3. The automatic stone setting machine of claim 1 further comprising vacuum means for selectively applying a vacuum through said aperture for retaining the pointed bottom of said stone in said aperture.

4. In the automatic stone setting machine of claim 1, said means for holding a setting comprising toothed wheel means operable for holding and advancing a continuous chain of interconnected settings.

5. In the automatic stone setting machine of claim 1, said v-shaped track comprising inner and outer wall portions, said inner wall portion being lower than said outer wall portion so that an upside-down stone would tend to fall out of said track.

6. An automatic stone setting machine comprising:
vibratory feed means operative for holding a plurality of ornamental stones therein, said stones including a pointed bottom, a flat top and a plurality of angled side surfaces;
an escapement on said vibratory feed means comprising a V-shaped track, an aperture at one end of said track and a cover plate mounted in closely spaced relation over said track adjacent said aperture, said feed means urging said plurality of stones along said track, under said cover plate and toward said aperture wherein said aperture receives the pointed bottom of an individual stone;
means for holding a setting;
a pick-up quill comprising a pick-up end, and a vacuum port in said pick-up end;
vacuum means for selectively applying a vacuum through said vacuum port;
reciprocating arm means for moving said pick-up quill between a first position, wherein said pick-up quill is positioned over said setting, and a second position wherein said pick-up quill is received on top of said stone at said aperture; and
means for setting said stone into said setting.

7. The automatic stone setting machine of claim 6 further comprising vacuum means for selectively applying a vacuum through said aperture for retaining the pointed bottom of said stone in said aperture.

8. In the automatic stone setting machine of claim 6, said means for holding a setting comprising toothed wheel means operable for holding and advancing a continuous chain of interconnected settings.

9. In the automatic stone setting machine of claim 6, said v-shaped track comprising inner and outer wall portions, said inner wall portion being lower than said outer wall portion so that an upside-down stone would tend to fall out of said track.

10. An automatic stone setting machine comprising:
vibratory feed means operative for holding a plurality of ornamental stones therein and advancing said stones toward a pick-up point, said stones including a pointed bottom, a flat top and a plurality of angled side surfaces;
means for holding a setting;
a pick-up quill having a pick-up end comprising an inwardly tapered side portion, a flat seat at an inner end thereof, and at least two circumferentially spaced vacuum ports located in said inwardly tapered side portion, said seat receiving the flat top of said stone, said side portion receiving the angled side faces of said stone;
vacuum means for selectively applying a vacuum through said vacuum ports;
reciprocating arm means for moving said pick-up quill between a first position, wherein said pick-up quill is positioned over said setting, and a second position wherein said pick-up quill is received on top of said stone at said pick-up point; and
means for setting said stone into said setting.

11. The automatic stone setting machine of claim 10 further comprising means for sensing a level of vacuum applied through said vacuum ports, said sensor generating an electrical signal only when all of said vacuum ports are substantially blocked by the angled side faces of said stone.

* * * * *